United States Patent
Goodman et al.

(10) Patent No.: US 11,288,336 B2
(45) Date of Patent: Mar. 29, 2022

(54) SYSTEMS AND METHODS FOR PROVIDING CONTENT ITEMS IN SITUATIONS INVOLVING SUBOPTIMAL NETWORK CONDITIONS

(71) Applicant: Google LLC, Mountain View, CA (US)

(72) Inventors: Frank Goodman, Mountain View, CA (US); Emily Wu, Mountain View, CA (US); Hassan Abyaneh, Tokyo (JP); Jered Wierzbicki, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 352 days.

(21) Appl. No.: 15/956,334

(22) Filed: Apr. 18, 2018

(65) Prior Publication Data

US 2019/0325073 A1    Oct. 24, 2019

(51) Int. Cl.
*G06F 16/957* (2019.01)
*H04L 29/08* (2006.01)
*H04L 67/025* (2022.01)
*H04L 67/04* (2022.01)

(52) U.S. Cl.
CPC ...... *G06F 16/9577* (2019.01); *G06F 16/9574* (2019.01); *H04L 67/025* (2013.01); *H04L 67/04* (2013.01)

(58) Field of Classification Search
CPC ............. G06F 16/9577; G06F 16/9574; H04L 67/025; H04L 67/04
USPC ........................................................ 709/217
See application file for complete search history.

(56) References Cited

U.S. PATENT DOCUMENTS

| | | | | |
|---|---|---|---|---|
| 6,564,250 B1 * | 5/2003 | Nguyen | ............... | G06F 16/9577 709/208 |
| 7,209,915 B1 * | 4/2007 | Taboada | ................ | G06F 16/951 707/755 |
| 7,325,045 B1 * | 1/2008 | Manber | ............... | G06F 11/0709 709/219 |
| 7,457,397 B1 * | 11/2008 | Saylor | ................ | H04M 3/4938 379/88.17 |
| 7,853,719 B1 * | 12/2010 | Cao | ..................... | G06F 16/9566 709/245 |
| 9,197,696 B1 * | 11/2015 | Jakatdar | .................. | H04L 67/06 |

(Continued)

FOREIGN PATENT DOCUMENTS

WO    WO2017180106    10/2017

OTHER PUBLICATIONS

Thommes, Daniel, et al., RemoteUI: A High-Performance Remote User Interface System for Mobile Consumer Electronic Devices', IEEE Transactions on Consumer Electronics, IEEE Service Center, New York, New York, vol. 58, No. 3, Aug. 1, 2012, pp. 1094-1102.

*Primary Examiner* — Madhu Woolcock
(74) *Attorney, Agent, or Firm* — Dority & Manning, P.A.

(57) ABSTRACT

The present disclosure provides systems and methods that provide improved access to content items in situations involving suboptimal network conditions. In particular, when a user attempts but fails to access a content item, a computing system can enable the user to access an alternative version of the content item that has been modified to account for the network conditions, thereby improving the accessibility and latency of content items for devices that are suffering from slow and/or unreliable network connections.

19 Claims, 8 Drawing Sheets

(56) References Cited

U.S. PATENT DOCUMENTS

| | | | | |
|---|---|---|---|---|
| 2003/0005078 A1* | 1/2003 | Turicchi, Jr. | ............ | H04L 69/40 709/217 |
| 2004/0032882 A1* | 2/2004 | Kane | ............ | H04L 29/06 370/477 |
| 2004/0107296 A1* | 6/2004 | Donker | ............ | G06F 16/9574 709/245 |
| 2005/0055420 A1* | 3/2005 | Wyler | ............ | G06F 16/9577 709/217 |
| 2006/0015573 A1* | 1/2006 | Hurst-Hiller | ............ | H04L 67/16 709/218 |
| 2006/0112089 A1* | 5/2006 | Broder | ............ | G06F 16/958 |
| 2006/0288084 A1* | 12/2006 | Nguyen | ............ | H04L 67/34 709/217 |
| 2007/0033264 A1* | 2/2007 | Edge | ............ | H04L 67/02 709/217 |
| 2007/0083425 A1* | 4/2007 | Cousineau | ............ | G06Q 30/00 705/14.72 |
| 2007/0088805 A1* | 4/2007 | Cyster | ............ | G06F 16/957 709/217 |
| 2008/0018658 A1* | 1/2008 | Bruno | ............ | G06F 16/9577 345/581 |
| 2009/0070306 A1* | 3/2009 | Stroe | ............ | G06F 16/9566 |
| 2010/0106571 A1* | 4/2010 | Catorcini | ............ | G06Q 30/02 705/14.4 |
| 2010/0138477 A1* | 6/2010 | Hanus | ............ | G06F 8/35 709/203 |
| 2011/0208992 A1* | 8/2011 | Cohen | ............ | H04L 67/20 714/2 |
| 2012/0054664 A1* | 3/2012 | Dougall | ............ | H04L 65/80 715/772 |
| 2012/0192080 A1* | 7/2012 | Lloyd | ............ | H04L 67/04 715/744 |
| 2012/0251083 A1* | 10/2012 | Svendsen | ............ | H04N 21/25435 386/285 |
| 2012/0284393 A1* | 11/2012 | Gandhi | ............ | H04L 47/823 709/224 |
| 2015/0106478 A1* | 4/2015 | Zeitlin | ............ | G06F 16/258 709/219 |
| 2015/0332147 A1* | 11/2015 | Anastas | ............ | G06N 7/005 706/12 |
| 2016/0092458 A1* | 3/2016 | Gottlob | ............ | G06F 16/958 715/230 |
| 2017/0206187 A1* | 7/2017 | Levi | ............ | H04L 43/0894 |

* cited by examiner

SYSTEMS AND METHODS FOR PROVIDING CONTENT ITEMS IN SITUATIONS INVOLVING SUBOPTIMAL NETWORK CONDITIONS

FIELD

The present disclosure relates generally to user interfaces for providing content items (e.g., webpages). More particularly, the present disclosure relates to systems and methods for providing improved access to content items in situations involving suboptimal network conditions.

BACKGROUND

A computing device can communicate over a communications network with one or more remotely located computing devices to enable a user to access various types of content items that are stored at such remotely located computing devices. As one example, web browsers executed by a user's computing device (e.g., smartphone) can allow a user to browse Internet web pages provided by remote web servers. Generally, the user's browser can make web page requests to the web servers and, in response, the web servers can obtain the requested web pages and serve those pages back to the user's web browser for display to the user. The requests and responses can, in some instances, use Hypertext Transport Protocol (HTTP). In some instances, a web page can be written in a markup language, such as the Hypertext Markup Language (HTML), and can include a number of embedded objects referenced by respective Uniform Resource Locators (URLs) within the HTML. The HTML of the web page can include many embedded URLs that define other objects within the web page to be obtained by web browser. For example, graphics, images, flash applications, links to other web pages, advertisements, etc. can be defined by embedded URLs. As the web browser encounters objects such as embedded URLs, the web browser can repeat the above sequence of processing for the web page to obtain each embedded object.

In one example, a web browser can allow a user to obtain a search results web page that includes a list of search results (e.g., in the form of web page links) that each direct the user to a corresponding search result (e.g., web page). For example, the search results web page can be provided in response to a search query entered by or on behalf of the user. In particular, in some instances, when the user clicks on or otherwise selects a web page link, in response to the user's selection, the web browser can load the web page that corresponds to the web page link for display to the user.

However, due to slow, unreliable, or otherwise suboptimal network conditions (e.g., a slow and/or unreliable Internet connection of the user's device), the user's device (e.g., its web browser) can fail to access a content item (e.g., a web page) selected by the user. Thus, the user's device may simply be unable to load the content item. Alternatively, while the web browser may be able to ultimately access the content item selected by the user if given sufficient time, it may be prohibitively costly to load the content item in both download time and/or bandwidth. For example, the user may become frustrated with waiting for the content item to load and may return to a previous user interface (e.g., the search results page) without having accessed the content item in full.

As an example, in some instances, an average target page can be over 1 megabyte (MB). A significant number of mobile connections globally still use 2G communications networks. With a typical 2G connection providing data rates of 5-10 KB/s and round-trip time of 600 ms many target pages remain inaccessible or prohibitively costly (in both time and bandwidth) to load. In particular, in some instances, target pages can fail to load in a reasonable amount of time under several circumstances: when the target page is down, when a user's connection is unreliable, or when a user's connection is too slow for data transfer on a website.

In addition to being a frustrating experience for the user, the inability to access a desired content item can result in an inefficient use of system resources. Thus, improved systems and methods for providing content items in situations involving poor network connections/conditions are needed.

SUMMARY

Aspects and advantages of embodiments of the present disclosure will be set forth in part in the following description, or can be learned from the description, or can be learned through practice of the embodiments.

One example aspect of the present disclosure is directed to a computing system. The computing system includes one or more processors, a display, and one or more non-transitory computer-readable media that collectively store instructions that, when executed by the one or more processors, cause the computing system to perform operations. The operations include providing a user interface associated with a first domain, the user interface comprising one or more interactive elements that enable a user to access one or more content items associated with a second domain. The operations include detecting a user selection of a first interactive element associated with a first content item of the one or more content items. The operations include determining the user has departed the user interface associated with the first domain to access the first content item in the second domain. The operations include determining that the user has returned to the user interface in the first domain without accessing the first content item. The operations include, in response to determining that the user has returned to the user interface without accessing the first content item, providing in the user interface a new interactive element that enables the user to access an alternative version of the first content item.

Another example aspect of the present disclosure is directed to a computer-implemented method. The method includes providing, by one or more computing devices, a user interface associated with a first domain, the user interface comprising one or more interactive elements that enable a user to access one or more content items associated with a second domain. The method includes detecting, by the one or more computing devices, a user selection of a first interactive element associated with a first content item of the one or more content items. The method includes determining, by the one or more computing devices, the user has departed the user interface associated with the first domain to access the first content item in the second domain. The method includes obtaining, by the one or more computing devices, one or more signals from at least one of the first domain and a user device operated by the user. The method includes determining, by the one or more computing devices and based on the one or more signals, that the user failed to access the first content item. The method includes in response to determining that the user failed to access the first content item, providing in the user interface a new interactive element that enables the user to access an alternative version of the first content item.

Another example aspect of the present disclosure is directed to one or more non-transitory computer-readable media that collectively store instructions that, when executed by one or more processors, cause the one or more processors to perform operations. The operations include providing a user interface associated with an internal server, the user interface comprising one or more interactive elements that enable a user to access one or more content items respectively associated with one or more external servers that are separate from the internal server. The operations include detecting a user selection of a first interactive element associated with a first content item of the one or more content items, the first content item associated with a first external server of the one or more external servers. The operations include determining the user has departed the user interface associated with the internal server to access the first content item at the first external server. The operations include determining that the user has returned to the user interface associated with the internal server without accessing the first content item. The operations include in response to determining that the user has returned to the user interface without accessing the first content item, generating an alternative version of the first content item. The operations include providing in the user interface a new interactive element that enables the user to access the alternative version of the first content item, wherein the alternative version of the first content item is hosted by the internal server.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
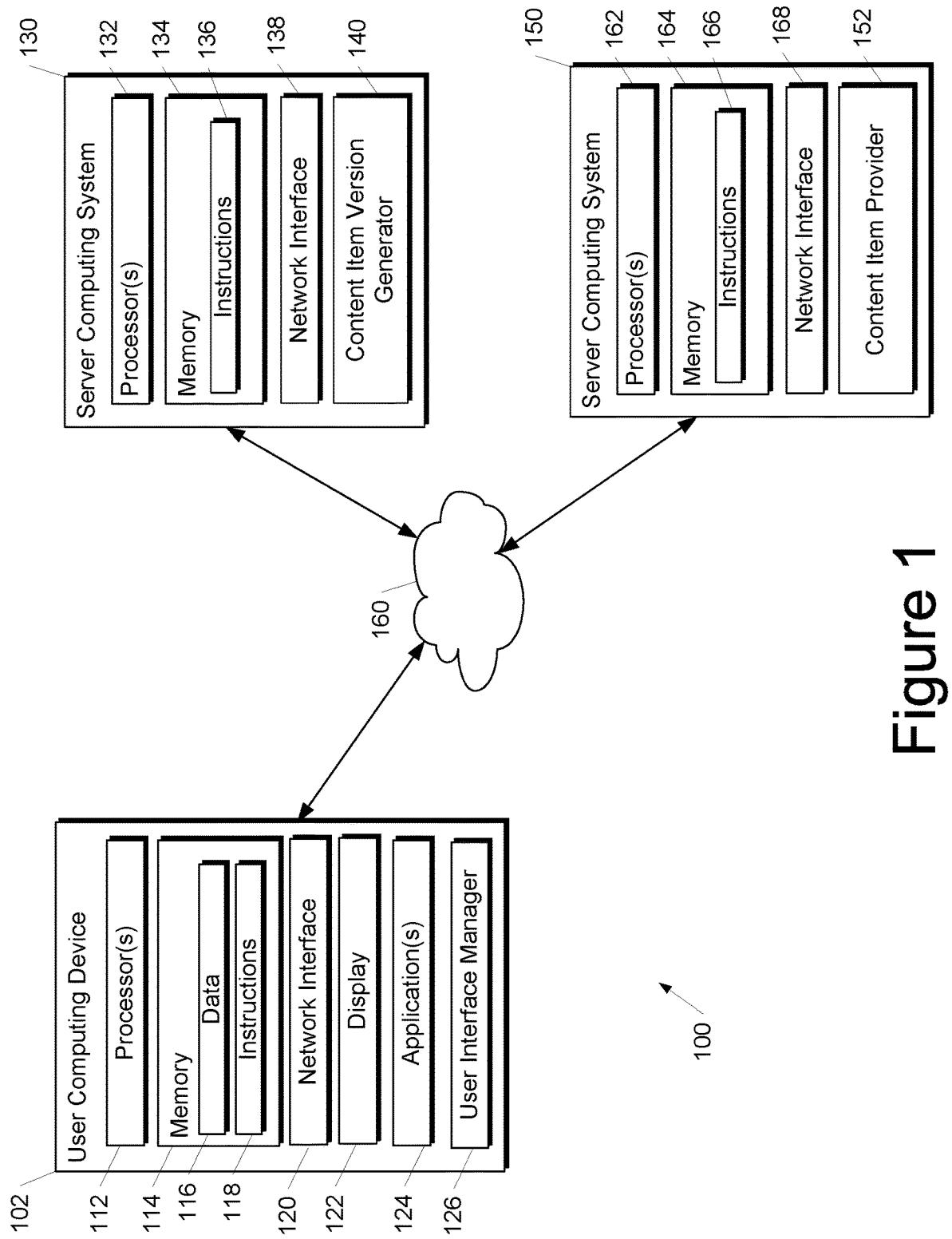
FIG. 1 depicts a block diagram of an example computing system according to example embodiments of the present disclosure.

Example aspects of the present disclosure are directed to systems and methods that provide improved access to content items in situations involving suboptimal network conditions. In particular, according to an aspect of the present disclosure, when a user attempts but fails (e.g., due to network bandwidth issues and/or poor device connection) to access a content item (e.g., a target web page), a computing system can enable the user to access an alternative version of the content item that has been modified to account for the network conditions, thereby improving the accessibility and latency of content items for devices that are suffering from slow and/or unreliable network connections (e.g., slow Internet connections, slow memory devices, etc.).

Thus, according to one aspect of the present disclosure a computing system can generate an alternative version of a content item that a user wants to access. Examples of an alternative version of a content item can include an alternative version that has a smaller download size than the content item, a transcoded version of the content item, a cached version of the content item, a content-reduced version of the content item, other suitable versions that can speed up downloading the content item, or some combination thereof.

According to another aspect of the present disclosure, the computing system can, in some instances, provide an interactive element (e.g., a web page link, etc.) that enables the user to access the alternative version in a user interface (e.g., a search results page, etc.). In particular, in some implementations, the interactive element that enables access to the alternative version of the content item can be provided only when it is detected that the user was unable to sufficiently access the primary version of the content item, such that traffic to the primary version of the content item is re-directed only when dictated by network conditions.

Further, according to additional aspects of the present disclosure, the computing system can detect that the user failed to access the primary version of the content item based on one or more signals that describe the attempt to access the content item.

Thus, the systems and methods of the present disclosure can selectively provide an interactive user interface element that provides access to an alternative version of a content item that has been optimized or otherwise altered to reduce download time and/or bandwidth of the content item. Ultimately, reducing download time and bandwidth will result in improving usability and latency of content items for devices that are experiencing slow connections.

More particularly, a computing system can provide a user interface that is associated with a first domain. The user interface can include one or more interactive elements that enable a user of the user device to access one or more content items. In some instances, the one or more content items can be associated with a second domain that is different from the first domain (e.g., external content).

As one example, a web browser can allow a user to enter a search query. In response to the search query, a search server can generate a search results web page that includes a list of search results (e.g., in the form of web page links) that each direct the user to a corresponding search result (e.g., web page). The search server can provide the search results web page to the web browser for display to the user. When the user clicks on or otherwise selects one of the web page links, in response to the user's selection, the web browser can load the web page that corresponds to the web page link for display to the user. For example, the web page that corresponds to the web page link can be hosted or otherwise provided by a server that is different from the search server that generated the search results web page.

As another example, alternatively or additionally to use of a web browser application, a search application (e.g., native search application) executed by the user's computing device can enable entry of a search query and receipt of search results, where the search results are provided in a user interface generated by the search application.

As yet another example, any arbitrary application can provide a user interface that includes interactive elements that enable access of content items. The content items can be external to the application or internal to the application. In one example, a maps application can provide a user interface that includes one or more icons on a map that, when selected by the user, direct the user's computing device to load additional information about a point of interest. In one example, selection of an icon can cause the user's device to load (e.g., from an application server associated with the application) an additional information card about the corresponding point of interest. In another example, selection of an icon can cause the user's device to load (e.g., from a web server that is different from an application server associated with the application) a web page maintained by corresponding point of interest (e.g., a restaurant web page that contains the restaurant's menu).

Thus, many different user interfaces can include interactive elements that enable access of content items. Although the present disclosure will be discussed with respect to the example of search results included in a search results web page, the present disclosure is not limited to the particular example.

According to another aspect of the present disclosure, the computing system can detect that a user has selected a first interactive element associated with a first content item in a second domain and that, as a result of such selection, the user has departed the user interface to access the first content item. As one example, a user can select a web page link to access a web page provided as a search result.

According to another aspect of the present disclosure, the computing system can determine that the user has returned to the user interface in the first domain without accessing the first content item in the second domain.

In some implementations, the computing system can determine that the user has returned to the user interface in the first domain without accessing the first content item in the second domain based on signals received from the first domain. For example, the computing system can determine that the user has returned to the user interface without accessing the first content item if the time between the selection of the interactive element by the user and the return to the user interface (i.e., the "click duration") is less than a threshold value. Other information can be used as well such as, as examples, a round-trip time associated with loading the user interface and/or a rate of return that describes how often users return to the user interface from the first content item.

In other implementations, the computing system can determine that the user has returned to the user interface in the first domain without accessing the first content item in the second domain based on signals received from and/or produced by the user's device. For example, an application (e.g., web application, maps application, browser application, search application such as a native search application, etc.) executed by the user computing device can generate and provide signals that describe the attempt to access the first content item. As one example, the signals can include a connection success signal that describes whether the first content item loaded at least in part or did not load at all. As another example, the signals can include a time to first paint signal that describes how long it took for the user device to render any portion of the first content item. As yet another example, the signals can include a time to first contentful paint signal that describes how long it took for the user device to render content of the first content item. In one specific example, the signals can be produced by an in-app browser of an application executed by the user computing device.

In another example, the computing system can determine that the user has returned to the user interface in the first domain without accessing the first content item in the second domain by detecting an error message. For example, the error message can indicate a timeout. In one example, an error message can be detected if the time to first contentful paint signal exceeds a threshold value.

Additionally, and/or alternatively, the error message can also indicate that a request (e.g., to render content of or otherwise load or access the first content item) exceeds system capabilities. For instance, in some instances, the user's device may not have enough memory to render the content of the first content item. In yet another example, the computing system can determine that the user has returned to the user interface in the first domain without accessing the first content item by examining a screen buffer. For example, the computing system can examine the screen buffer and note that no new complete page has been loaded since the request to access the first content item.

According to example aspects of the present disclosure, in response to determining that the user has returned to the user interface in the first domain without accessing the first content item in the second domain, the computing system can provide an interactive element (e.g., a link, etc.) to an alternative version (e.g., a transcoded version, etc.) of the content item (e.g., a target web page). In particular, the alternative version of the content item can be or have been optimized for slower connections.

Examples of an alternative version of a content item can include an alternative version that has a smaller download size than the content item, a transcoded version of the content item, a cached version of the content item, a content-reduced version of the content item, other suitable versions that can speed up downloading the content item, or some combination thereof.

As another example, the alternative version of the content item can be a mobile-optimized version such that the alternative version can be displayed by a mobile computing device that has a smaller display scale than a non-mobile computer. In some implementations, the computing system can remove one or more visual aspects (e.g., images, videos, or animations, etc.) of the content item to generate the alternative version of the content item. In some implementations, the computing system can reduce resolutions of one or more visual aspects of the content item.

In some implementations, the computing system can generate the alternative version of the content item in response to determining that the user has returned to the user interface in the first domain without accessing the first content item in the second domain. Thus, in some implementations, the alternative version of the content item can be generated "on-the-fly" in response to the user returning the user interface. In other implementations, the computing system can generate alternative versions of many different content items (e.g., a number of the most popular or most commonly accessed content items) and store such alternative versions for later usage. Thus, in some implementations, in response to the user returning to the user interface without accessing the content item, the computing system can provide access to a previously generated alternative version that is, for example, hosted at the first domain.

Thus, the systems and methods of the present disclosure can provide an alternative version of a content item that is accessible to a mobile user in response to determining that the mobile user has returned to a user interface (e.g., search results page, etc.) without accessing the content item. As one example application, the computing system can provide an alternative version of some content items (e.g., external web pages, etc.) for desktop search. For example, users can select an alternative version of some external web pages from a drop-down menu beneath the search result link in the event the search result link does not load.

In another example application, the computing system can provide a link to an alternative version of a target page optimized for slower connection when a user returns to an search results page after failing to load the target page. For example, a user clicks a search result associated with an external version for Website X listed on a search results page and after waiting several seconds for Website X to load, decides to return to the search results page and to try another link. When returning to the search results page, the computing system can dynamically update the just-selected search result with a new link and a message (e.g., "Page didn't load? Try our optimized version."). If the user clicks on this newly added link, the computing system can take the user to an alternative version of Website X that can load much faster than the external version of Website X. This solves the problem of leaving the user without a way to access Website X upon returning to the search results page.

In addition to using an on-back event (e.g., returning to the search results page, etc.) for triggering to providing the alternative version, in some implementations, the computing system can determine that a user has returned to the user interface without accessing the content item based on one or more signals indicating that the user failed to access the content item. For example, the computing system can determine that a user has returned to the search results page without accessing Website X based on one or more signals and/or one or more search application installed in mobiles, such as click duration from servers, connection success from the applications, and time to first paint from the applications, for more robust and user-tailored triggering.

Thus, the systems and methods can ameliorate the issues identified above, including slow connections and low-memory devices (e.g., random-access memory devices, etc.), and can also be used in conjunction with "Speed Mode" web browsers that can enable fast download speed. As an example, for certain enabled queries, the methods and systems can replace eligible standard target page URLs used for search results with URLs with alternative versions of each target page. For instance, if a user's round-trip time exceeds a preset threshold that can be an acceptable time period for Internet connections, the computing system can determine that accessing of the target page has failed, and can generate an alternative version of the target page. As such, the computing system can allow users to extend their search journey beyond a single query and result set by offering document-specific follow-up queries to users on a clicked web result after returning to the search results page with the web browser's back button.

As such, the systems and methods of the present disclosure can solve the problem of mobile search users visiting a web result link that can direct a user to an external web page, only to, return to the search results page without recourse after discovering that Internet connection is too slow and/or unreliable to load the external web page or that the external web page is not available. Generally, this problem exists for any external links on a web page. In particular, it's often witnessed in search results pages because search results pages display a large quantity of external links and are often used in markets with poorer Internet connectivity.

Thus, the present disclosure provides systems and methods that optimize content items to improve usability and latency for slow Internet connections. The present disclosure provides a number of technical effects and benefits.

As one example technical effect and benefit, in some implementations, the systems and methods of the present disclosure can provide an alternative version of a content item (e.g., a target page) in a user interface (e.g., a search results page) to reduce download time and bandwidth, when signals are detected that indicate that the user failed to load the content item, thereby reducing bandwidth. Ultimately, reducing download time and bandwidth will result in successful and fast access to content items for slow Internet connections.

As another example technical effect and benefit, the systems and methods of the present disclosure can provide an alternative version of a content item only when the systems and methods of the present disclosure detects signals to indicate that the user failed to load the content item, rather than providing an alternative version for each content item in the user interface. As such, the alternative versions do not crowd the user interface to force users to decide to select an alternative version before accessing a content item.

As yet another example technical effect and benefit, the systems and methods of the present disclosure can benefit developers of external web pages such that the developers can understand how to improve the external web pages, because, in some implementations, users must first attempt to visit the external web pages directly before receiving a link to an alternative version of the external web page. The first attempt can help developers to collect information associated with the first attempt and to utilize the collected information to improve the external web pages and/or corresponding websites.

As yet another example technical effect and benefit, the systems and methods of the present disclosure can enable reduced processing resource consumption. For example, the system and the methods for present disclosure can generate and optimize an alternative version of the first content item for a user device (e.g., a mobile, a tablet, etc.). The alternative version can have a reduced content size which reduces the processing resource consumption required to access the content item.

With reference now to the Figures, example embodiments of the present disclosure will be discussed in further detail.

Example Devices and Systems

FIG. 1 depicts a block diagram of an example computing system 100 according to example embodiments of the present disclosure. The computing system 100 can include a user computing device 102, a server computing system 130, a server computing system 150, and a network 160. The user computing device 102 can perform aspects of the present disclosure, the server computing system 130 can perform aspects of the present disclosure, the server computing system 150 can perform aspects of the present disclosure, or some combination of the user computing device 102, the server computing system 130 and the server computing system 150 can perform aspects of the present disclosure. The user computing device 102, the server computing system 130, and the server computing system 150 can be communicatively coupled to each other over the network 160. In alternative configurations, different and/or additional components may be included in the computing system 100.

The user computing device 102 can be any form of device, such as, for example, a mobile computing device (e.g., a smartphone, tablet, etc.), a computing device that is able to be worn (e.g., computing device embedded in a pair of eyeglasses, a wristband, a necklace, etc.), handheld computing device, computing device embedded in a vehicle, home appliance, or other system, smart speaker, laptop, desktop, gaming console, etc.

The user computing device 102 can include one or more processors 112, a memory 114, a network interface 120, a display 122, one or more applications 124, and a user interface manager 126. In alternative configurations, different and/or additional components may be included in the user computing device 102.

The one or more processors 112 can be any form of processing device, including, for example, a processing unit, a microprocessor, a controller, a microcontroller, an application specific integrated circuit, etc.

The memory 114 can include one or more of any non-transitory computer-readable medium, including, for example, RAM (e.g., DRAM), ROM (e.g., EEPROM), optical storage, magnetic storage, flash storage, solid-state storage, hard drives, or some combination thereof. The memory 114 can store data 116 that can be generated from other components of the user computing device 102. The memory 114 can store one or more sets of instructions 118 that, when executed by the computing device 102, cause the computing device 102 to perform operations consistent with the present disclosure.

The network interface 120 can enable communications over the network 160. The network interface 120 can include any number of components to provide networked communications (e.g., transceivers, antennas, controllers, cards, etc.).

The display 122 can include different types of display components, such as, for example, a light-emitting diode display (e.g., organic light-emitting diode display), a liquid-crystal display (e.g., thin-film-transistor liquid-crystal display), a thin-film diode display, etc. In some implementations, the display 122 can also be touch-sensitive. For example, the display 122 can be a capacitive touchscreen, a resistive touchscreen, or other touch-sensitive technologies. Thus, in some implementations, the display 122 can serve as or be a touch-sensitive component. In other implementations, the user computing device 102 can have an additional or alternative touch-sensitive component that is separate and distinct from the display 122. For example, the touch-sensitive component can be a touch pad or the like.

The one or more applications 124 can allow a user of the user computing device 102 to interact with the server computing system 130. For example, the user computing device 102 can execute an application (e.g., a browser application, maps application, dedicated search application, software, program, etc.) to enable interaction between the user computing device 102 and the server computing system 130 via the network 160. In some implementations, the user computing device 102 can interact with the server computing system 130 through an application programming interface (API) running on a native operating system of the user computing device 102.

The user interface manager 126 can control and/or manage presentation of a user interface on the display 122, including, for example, tasks like presenting the user interface, modifying the user interface, receiving user input directed to the user interface, etc. In some implementations, the user interface manager 126 can be included in an application that can generate the user interface. In other implementations, the user interface manager 126 can be separate from whichever component (e.g., application) generated the user interface. In some implementations, the user interface manager 126 can be an aspect or component of an operating system of the user computing device 102.

In some implementations, the user interface manager 126 can interact with the server computing system 130 via the network interface 120. The user interface manager 126 can receive a user interface from the server computing system 130 for display and can send one or more user inputs received by the user computing device 102 to the server computing system 130. In some implementations, the user interface manager 126 can modify the received user interface from the server computing system 130 to meet display conditions (e.g., display resolution, etc.) of the display 122.

In some implementations, the user interface manager 126 can continuously or periodically analyze the user interface that is currently or about to be displayed by the user computing device 102 to identify user interface elements that are or should be selectable by the user of the computing device 102. The user interface manager 126 can send one or user selections of such elements to the server computing system 130.

In some implementations, the user interface manager 126 can include computer logic utilized to provide desired functionality. The user interface manager 126 can be implemented in hardware, firmware, and/or software controlling a general purpose processor. For example, in some implementations, the user interface manager 126 can include program files stored on a storage device, loaded into a memory and executed by one or more processors. In other implementations, the user interface manager 126 can include one or more sets of computer-executable instructions that are stored in a tangible computer-readable storage medium such as RAM hard disk or optical or magnetic media.

The server computing system 130 can include one or more processors 132, a memory 134, a network interface 138, and a content item version generator 140. In alternative configurations, different and/or additional components may be included in the server computing system 130.

The one or more processors 132 can be any form of processing device, including, for example, a processing unit, a microprocessor, a controller, a microcontroller, an application specific integrated circuit, etc.

The memory 134 can include one or more of any non-transitory computer-readable medium, including, for example, RAM (e.g., DRAM), ROM (e.g., EEPROM), optical storage, magnetic storage, flash storage, solid-state storage, hard drives, or some combination thereof. The memory 134 can store one or more sets of instructions 136 that, when executed by the server computing device 130, cause the server computing device 130 to perform aspects of the present disclosure. In some implementations, the memory 134 can store data that can be generated by other components (e.g., the content item version generator 140, a content item provider 152, etc.)

The network interface 138 can enable communications over the network 160. The network interface 138 can include any number of components to provide networked communications (e.g., transceivers, antennas, controllers, cards, etc.).

The content item version generator 140 can provide improved access to content items in situations involving suboptimal network conditions. In particular, in some implementations, when a user attempts but fails (e.g., due to network bandwidth issues and/or poor device connection) to access a content item, the content item version generator 140 can enable a user to access an alternative version of the content item that has been modified to account for the network conditions, thereby improving the accessibility and latency of content items for devices that are suffering from slow and/or unreliable network connections (e.g., slow Internet connections, slow-memory devices, etc.).

The content item version generator 140 can generate an alternative version of a content item that a user wants to access. The content item version generator 140 can provide an interactive element that enables the user to access the alternative version in a user interface. In particular, in some implementations, the interactive element that enables access to the alternative version of the content item can be provided only when it is detected that the user was unable to sufficiently access the primary version of the content item, such that traffic to the primary version of the content item is re-directed only when dictated by network conditions. However, in other implementations, the interactive element that enables access to the alternative version of the content item can be provided initially and/or without regard to whether the user was unable to sufficiently access the primary version of the content item.

The content item version generator 140 can detect that the user failed to access the primary version of the content item based on one or more signals that describe the attempt to access the content item.

Thus, the content item version generator 140 can selectively provide an interactive user interface element that provides access to an alternative version of a content item that has been optimized or otherwise altered to reduce download time and/or bandwidth of the content item. Ultimately, reducing download time and bandwidth will result in improving usability and latency of content items for devices that are experiencing slow connections. Examples are further described in conjunction with FIG. 2 through FIG. 4C.

In some implementations, the content item version generator 140 can include computer logic utilized to provide desired functionality. The content item version generator 140 can be implemented in hardware, firmware, and/or software controlling a general purpose processor. For example, in some implementations, the content item version generator 140 can include program files stored on a storage device, loaded into a memory and executed by one or more processors. In other implementations, the content item version generator 140 can include one or more sets of computer-executable instructions 136 that are stored in a tangible computer-readable storage medium such as RAM hard disk or optical or magnetic media.

The server computing system 150 can include one or more processors 162, memory 164 including instructions 166, network interface 168, and a content item provider 152.

The content item provider 152 can provide content items to the user computing device 102. A content item can include a markup language document identifying content and including instructions specifying formatting or presentation of the identified content. Examples of a content item can include a web page, one or more objects (e.g., graphics, images, videos, flash applications, links to other web pages, advertisements) within a web page or standing alone, a file, or other suitable content that can be provided to the user computing device 102.

In some implementations, the server computing system 150 can be separate and distinct from the server computing system 130. For example, the server computing system 130 can be associated with a first domain while the server computing system 150 is associated with a second domain that is different from the first domain. Thus, in some implementations, the content item provider 152 can be included in an external server that is external to the server computing system 130 while the content item version generator 140 is included in an internal server that is internal to server computing system 130. In other implementations, the server computing system 150 can be included in the same domain as the server computing system 130.

In some implementations, the content item provider 152 can include computer logic utilized to provide desired functionality. The content item version provider 152 can be implemented in hardware, firmware, and/or software controlling a general purpose processor. For example, in some implementations, the content item version provider 152 can include program files stored on a storage device, loaded into a memory and executed by one or more processors. In other implementations, the content item version provider 152 can include one or more sets of computer-executable instructions 166 that are stored in a tangible computer-readable storage medium such as RAM hard disk or optical or magnetic media.

The network 160 can be any type of communications network, such as a local area network (e.g., intranet), wide area network (e.g., Internet), or some combination thereof and can include any number of wired or wireless links. In general, communication between the server computing system 130 and the user computing device 102 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). The server computing system 130 can communicate with the computing device 102 over the network 160 by sending and receiving data.

In one example implementation of the computing system 100, the server computing system 130 can be a search server that includes a search engine that identifies search results that are responsive to a search query received from the user computing device 102. For example, the server computing system 130 can provide to the user computing device 102 data descriptive of a search results page for display to the user. Further, the server computing system 150 can be a web server that hosts various web pages. One of the web pages hosted by the server computing system 150 can be included in the search results page provided to the user computing device 102 by the server computing system 130. The user computing device 102 can leave the search results page to attempt to access the web page hosted by the server computing system 150 (e.g., via interaction with the content item provider 152). In some implementations, if the user computing device 102 returns to the search results page without accessing the web page hosted by the server computing system 150, the content item version generator 140 can provide an opportunity for the user computing device 102 to access an alternative version of the web page. For example, the alternative version of the web page can be hosted by the server computing system 130.

In another example implementation of the computing system 100, the server computing system 130 can be an application server that interacts with an application 124 executed by the user computing device 102 (e.g., a maps application, a dedicated search application, an email application, a document management application, a chat application, etc.). For example, the server computing system 130 can provide to the user computing device 102 data for inclusion in a user interface of the application 124 that is being displayed to the user. Further, the server computing system 150 can be a web server that hosts various web pages (e.g., a restaurant web page that contains the restaurant's menu). One of the web pages hosted by server computing system 150 (e.g., the restaurant web page that contains the restaurant's menu) can be included in the application data provided to the user computing device 102 by the server computing system 130 (e.g., maps application data that includes the restaurant as a point of interest). The user computing device 102 can leave the application user interface to attempt to access the web page hosted by the server computing system 150 (e.g., via interaction with the content item provider 152). In some implementations, if the user computing device 102 returns to the application user interface without accessing the web page hosted by the server computing system 150, the content item version generator 140 can provide an opportunity for the user computing device 102 to access an alternative version of the web page. For example, the alternative version of the web page (e.g., cached version of the restaurant web page that contains the restaurant's menu) can be hosted by the server computing system 130.

Further, any of the processes, operations, programs, applications, or instructions described as being stored at or performed by the server computing system 130 can instead be stored at or performed by the user computing device 102 or by the server computing system 150, in whole or in part, and vice versa. Thus, in some implementations, the user computing device 102 or the server computing system 150 can include and implement the content item version generator 140.

Example Methods

Figure 2:
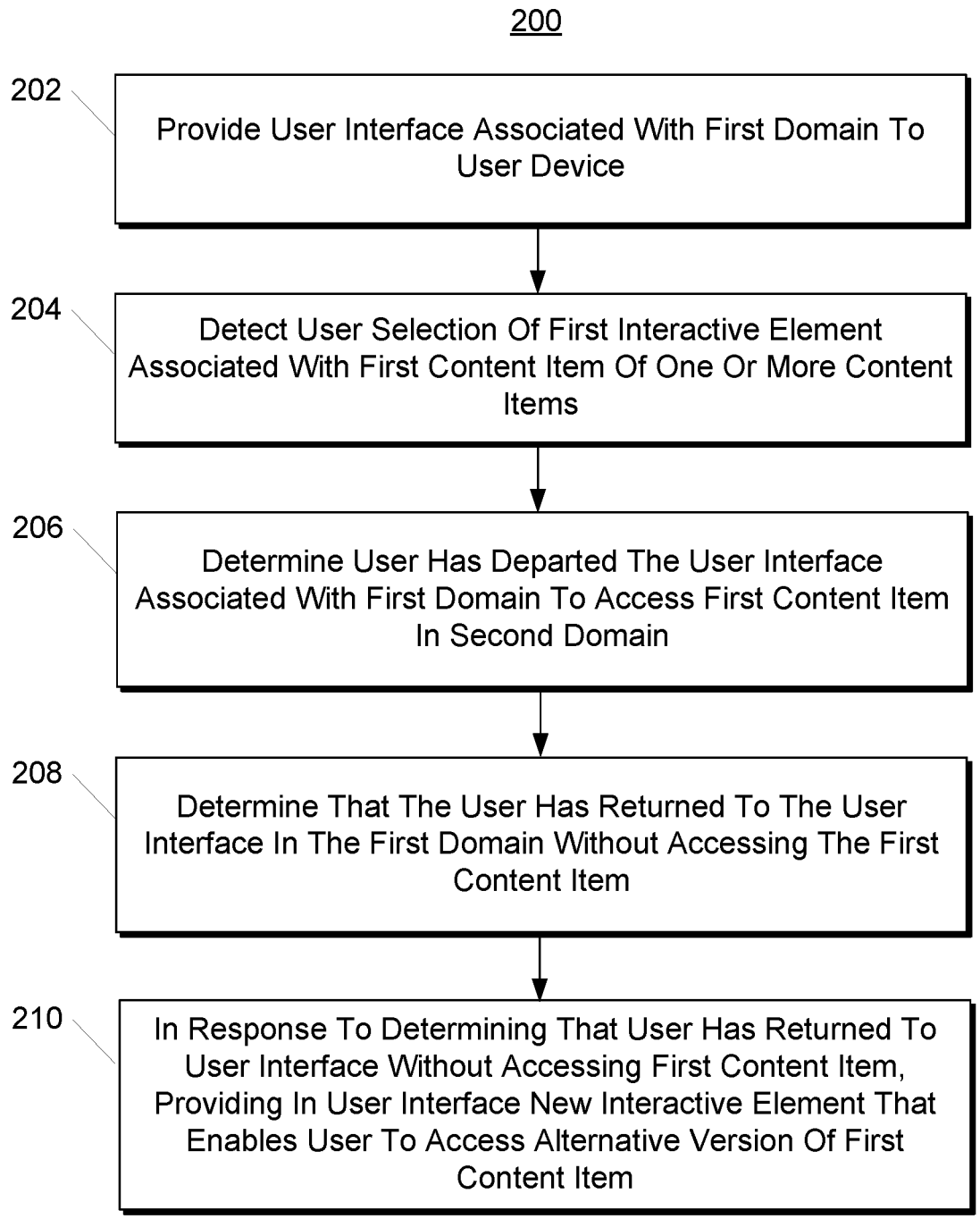
FIG. 2 depicts a flow chart diagram of an example method to generate an alternative version of content item according to example embodiments of the present disclosure.

FIG. 2 depicts a flow chart diagram of an example method 200 to generate an alternative version of content item according to example embodiments of the present disclosure. Although method 200 will be discussed with reference to the example computing system 100 of FIG. 1, the method can be performed by any number of different computing systems.

At 202, the content item version generator 140 can provide a user interface associated with a first domain to a user device. The user interface can include one or more interactive elements that enable a user of the user device to access one or more content items associated with a second domain.

As one example, a web browser can allow a user to enter a search query. In response to the search query, a search server can generate a search results web page that includes a list of search results (e.g., in the form of web page links) that each direct the user to a corresponding search result (e.g., web page). The search server can provide the search results web page to the web browser for display to the user. When the user clicks on or otherwise selects one of the web page links, in response to the user's selection, the web browser can load the web page that corresponds to the web page link for display to the user. For example, the web page that corresponds to the web page link can be hosted or otherwise provided by a server that is different from the search server that generated the search results web page.

As another example, alternatively or additionally to use of a web browser application, a search application (e.g., native search application) executed by the user computing device 102 can enable entry of a search query and receipt of search results, where the search results are provided in a user interface generated by the search application.

As yet another example, any arbitrary application can provide a user interface that includes interactive elements that enable access of content items. The content items can be external to the application or internal to the application. In one example, a maps application can provide a user interface that includes one or more icons on a map that, when selected by the user, direct the user's computing device to load additional information about a point of interest. In one example, selection of an icon can cause the user's device to load (e.g., from an application server associated with the application) an additional information card about the corresponding point of interest. In another example, selection of an icon can cause the user's device to load (e.g., from a web server that is different from an application server associated with the application) a web page maintained by corresponding point of interest (e.g., a restaurant's home page).

Thus, many different user interfaces can include interactive elements that enable access of content items. Although the present disclosure will be discussed with respect to the example of search results included in a search results web page, the present disclosure is not limited to the particular example.

At 204, the content item version generator 140 can detect that a user has selected a first interactive element associated with a first content item in a second domain. At 206, the content item version generator 140 can determine that, as a result of the selection at 204, the user has departed the user interface to access the first content item. As one example, a user can select a web page link to access a web page provided as a search result.

At 208, the content item version generator 140 can determine that the user has returned to the user interface in the first domain without accessing the first content item in the second domain.

In some implementations, the content item version generator 140 can determine that the user has returned to the user interface in the first domain without accessing the first content item in the second domain based on signals received from the first domain. For example, the content item version generator 140 can determine that the user has returned to the user interface without accessing the first content item if the time between the selection of the interactive element by the user and the return to the user interface (i.e., the "click duration") is less than a threshold value. Other information can be used as well such as, as examples, a round-trip time associated with loading the user interface and/or a rate of return that describes how often users return to the user interface from the first content item.

In other implementations, the content item version generator 140 can determine that the user has returned to the user interface in the first domain without accessing the first content item in the second domain based on signals received from and/or produced by the user's device. For example, an application (e.g., web application, maps application, browser application, search application such as a native search application, etc.) executed by the user computing device can generate and provide signals that describe the attempt to access the first content item. As one example, the signals received from and/or produced by the user device can include a connection success signal that describes whether the first content item loaded at least in part or did not load at all. As another example, the signals can include a time to first paint signal that describes how long it took for the user device to render any portion of the first content item. As yet another example, the signals can include a time to first contentful paint signal that describes how long it took for the user device to render content of the first content item.

In one specific example, the signals can be produced by an in-app browser of an application executed by the user computing device.

At 210, in response to determining that the user has returned to the user interface in the first domain without accessing the first content item in the second domain, the content item version generator 140 can provide an interactive element (e.g., a link, etc.) to an alternative version (e.g., a transcoded version, etc.) of the content item (e.g., a target web page). In particular, the alternative version of the content item can be or have been optimized for slower connections.

Examples of an alternative version of a content item can include an alternative version that has a smaller download size than the content item, a transcoded version of the content item, a cached version of the content item, a content-reduced version of the content item, other suitable versions that can speed up downloading the content item, or some combination thereof.

As another example, the alternative version of the content item can be a mobile-optimized version such that the alternative version can be displayed by a mobile computing device that has a smaller display scale than a non-mobile computer. In some implementations, the content item version generator 140 can remove one or more visual aspects (e.g., images, videos, or animations, etc.) of the content item to generate the alternative version of the content item. In some implementations, the content item version generator 140 can reduce resolutions of one or more visual aspects of the content item.

In some implementations, the content item version generator 140 can generate the alternative version of the content item in response to determining at 208 that the user has returned to the user interface in the first domain without accessing the first content item in the second domain. Thus, in some implementations, the alternative version of the content item can be generated "on-the-fly" in response to the user returning the user interface. In other implementations, the content item version generator 140 can generate alternative versions of many different content items (e.g., a number of the most popular or most commonly accessed content items) and store such alternative versions for later usage. Thus, in some implementations, in response to the user returning to the user interface without accessing the content item, the content item version generator 140 can provide access to a previously generated alternative version that is, for example, hosted at the first domain.

Example Alternative Versions of Content Items

Figure 3A:
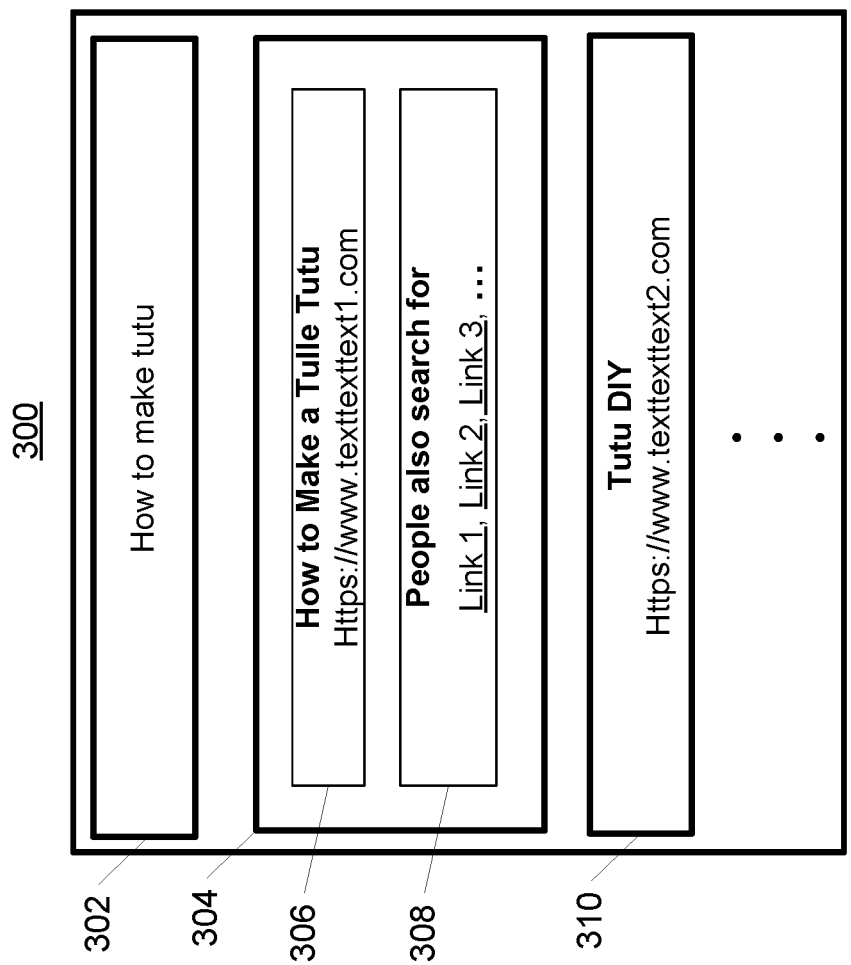
FIGS. 3A, 3B and 3C depict example search results pages that provide a link to an alternative version of a web page according to example embodiments of the present disclosure.
Figure 3B:
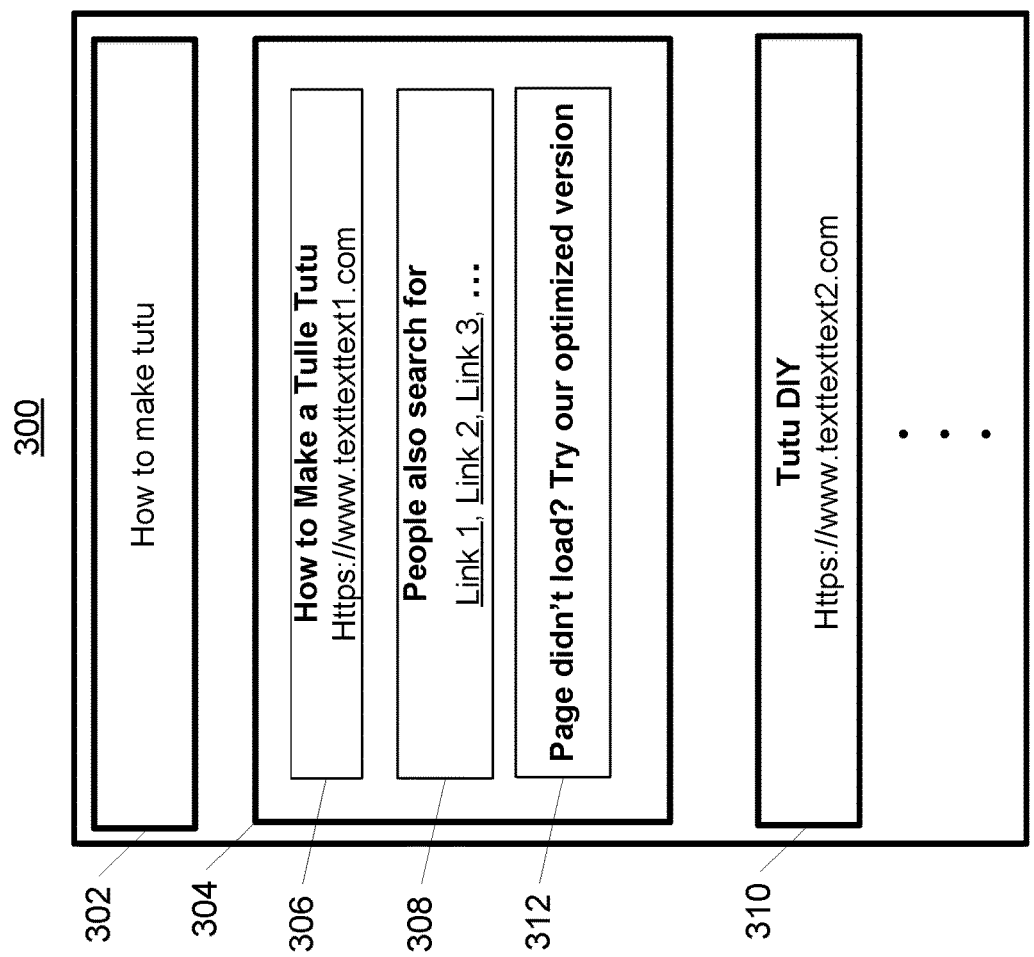
Figure 3C:
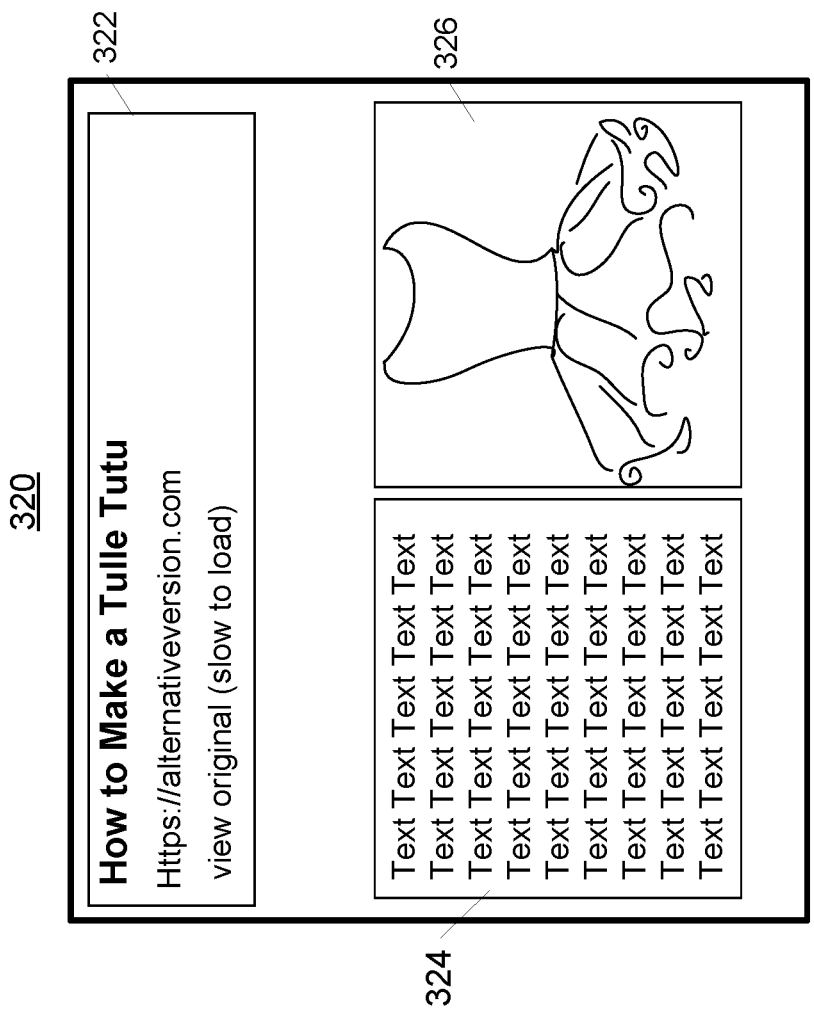

FIGS. 3A, 3B and 3C depict an example search results page that provides a link to an alternative version of a web page according to example embodiments of the present disclosure.

FIG. 3A shows an example search results web page 300 in response to a search query 302 (e.g., "how to make tutu") inputted by a user. The search results web page 300 includes the search query 302 and a list of search results (e.g., a first search result 304, a second search result 310, etc.). Each search result can include a web page link that directs the user to a primary version of a corresponding web page and/or a list of links that each provides a link to access a search results web page associated with similar search queries (e.g., make a tulle tutu, make a tutu, tulle tutu, etc.) that other people previously used.

For example, the first search result 304 includes a web page link 306 with a web address (e.g., "Https://www.texttexttext1.com") that directs a user to a primary version of a web page of Website X, and a list of links 308 (e.g., link 1, link 2, link 3, etc.) that each provides a link to a search results web page associated with similar search queries (e.g., make a tulle tutu, make a tutu, tulle tutu, etc.) that other people previously used. The second search result 310 only includes a web page link 310 with a web address (e.g., "Https://www.texttexttext2.com") that directs a user to a primary version of a web page of Website Y. The search results page 300 can be generated by an internal search server (e.g., the server computing system 130). The primary version of a web page of Website X and/or the primary version of a web page of Website Y can be provided by an internal content item provider server that is different from the internal search server. In other implementations, the primary versions can be provided by one or more external to the server computing system 130.

If the user selects (e.g., clicks on) a search result, in response to the user's selection, a web browser and/or an application (e.g., a web browser application, a search application, etc.) executed by the user computing device 102 performs loading a primary version of a web page that corresponds to the selected web page link. If the web browser and/or the application fails to load the primary version of the web page, the first search result 304 can be automatically updated to include a new link 312 and/or a message to an alternative version of the web page.

More particularly, as shown in FIG. 3B, the user selected the web page link 306, but failed to access a primary version of a web page via the web page link 306. The first search result 304 is automatically updated to include a new link 312 and a message ("Page didn't load? Try our optimized version") to an alternative version 320 of the web page. In some implementations, the newly added link 312 can be alongside the original link 306, as illustrated in FIG. 3B. In other implementations, the newly added link 312 can replace the original link 306.

If the user clicks on this newly added link 312, the user can be directed to the alternative version 320 of the web page that can be loaded much faster than the primary version of the web page. The alternative version can include modified and/or altered content reduce download time and/or bandwidth of the web page. Ultimately, reducing download time and bandwidth will result in improving usability and latency of the web page that is experiencing slow connections.

As shown in FIG. 3C, the example alternative version 320 of the web page includes a title 322 of the web page, textual content 324 (e.g., texts, words, documents, etc.), and imagery content 326 (e.g., images, videos, etc.). The title 322 includes different web address (e.g., "Https://alternativeversion.com") from the web address (e.g., Https://www.texttexttext1.com) of the primary version, and a link to the primary version. This solves the problem of leaving the user without a way to access Website X upon returning to the search results page 300.

In some implementations, the alternative version 320 of the web page can be a transcoded version of the web page, a cached version of the web page, or a content-reduced version of the web page. In some implementations, the textual content 324 and/or the imagery content 326 can be modified and/or altered to reduce download time and/or bandwidth of the web page. For example, the resolution of the textual content 324 and/or the imagery content 326 can be reduced relative to a corresponding content in the primary version. As an example, one or more portions of the textual content 324 and/or the imagery content 326 can be removed.

Figure 4A:
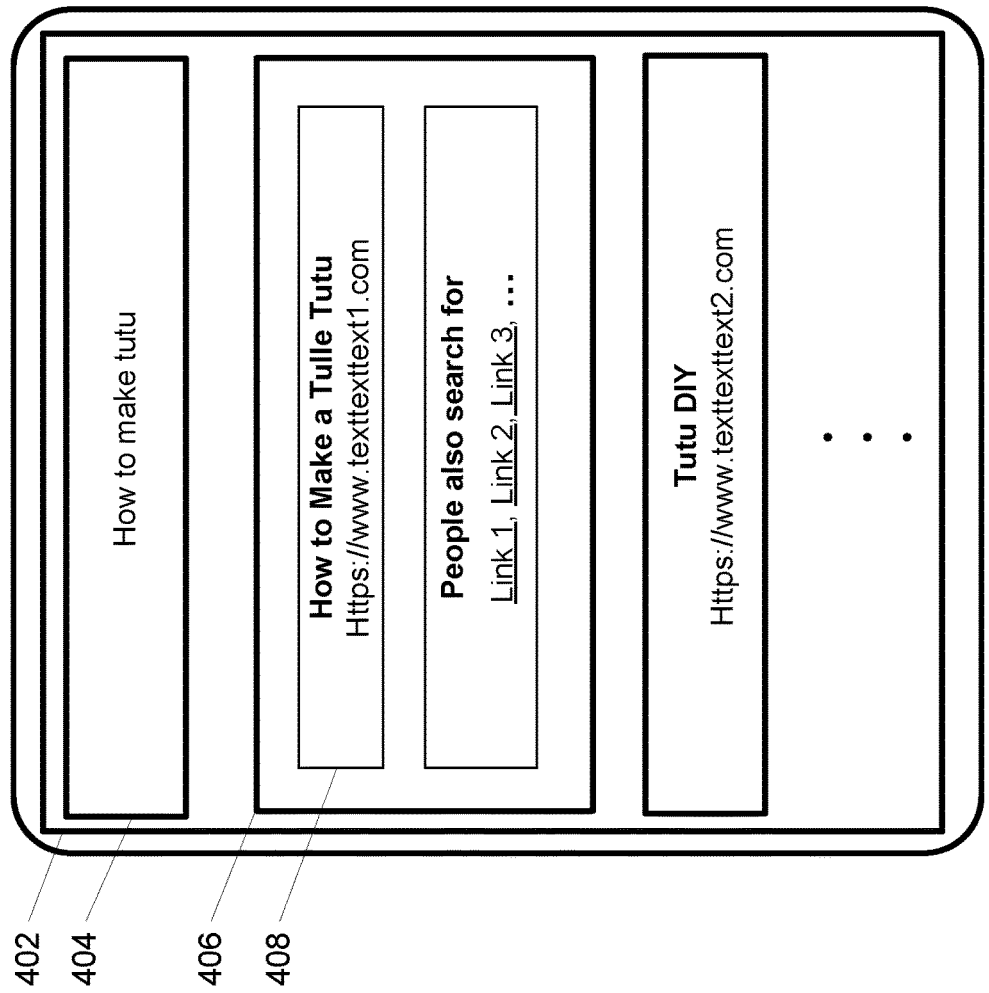
FIGS. 4A, 4B and 4C depict example search results pages that provide a link to a mobile-optimized version of a web page in a mobile device according to example embodiments of the present disclosure.
Figure 4B:
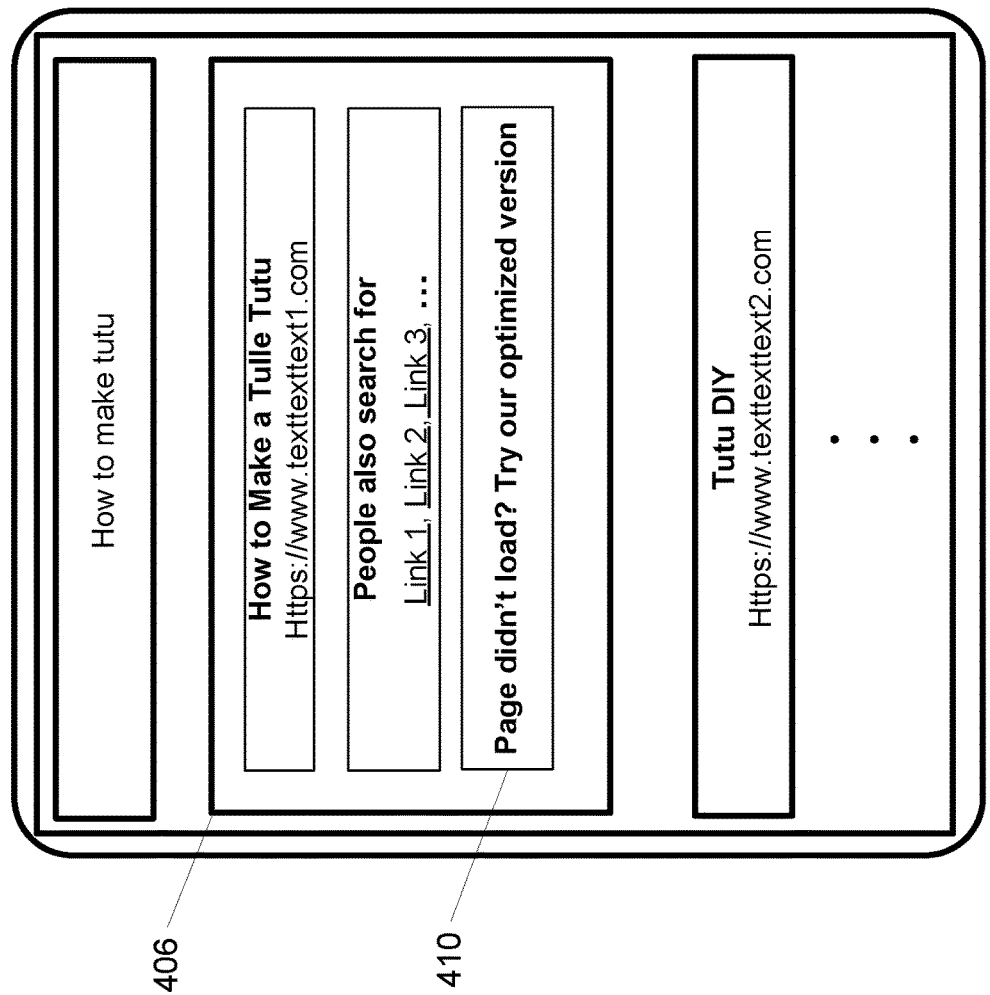
Figure 4C:
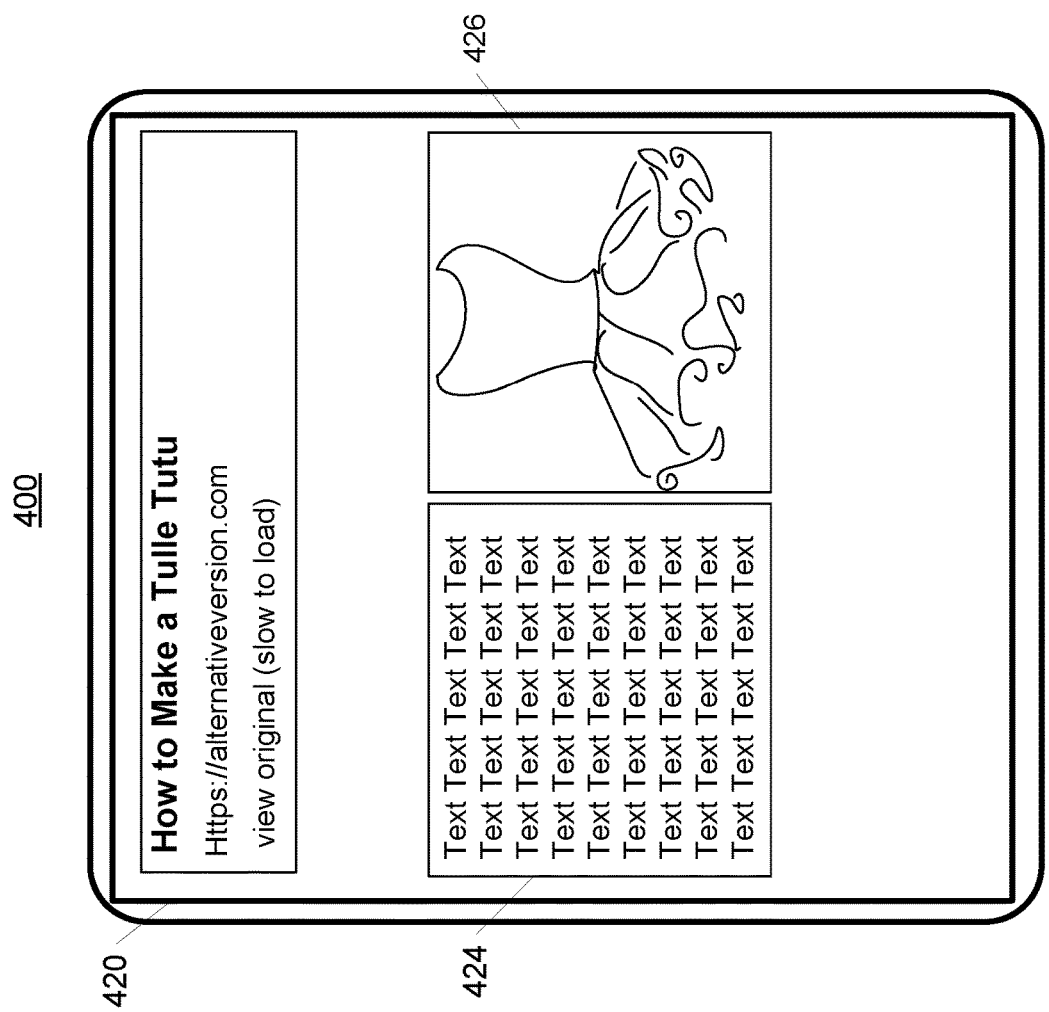

FIGS. 4A, 4B and 4C depict an example search results page that provides a link to a mobile-optimized version of a web page in a mobile device 400 according to example embodiments of the present disclosure. A search results page 402 is displayed on the screen of the mobile device 400 in response to a search query 404 "How to make tutu" inputted by a user. The user selected a web page link 408 in a search result 406, but failed to access a primary version of a web page via the web page link 408. The search result 406 is automatically updated to include a new link 410 and a message ("Page didn't load? Try our optimized version") to a mobile-optimized version 420 of the web page. In some implementations, the mobile-optimized version of the web page can be a transcoded version of the web page, a cached version of the web page, or a content-reduced version of the web page. In some implementations, textual content 424 and/or the imagery content 426 can be modified and/or altered to reduce download time and/or bandwidth of the web page. Ultimately, reducing download time and bandwidth will result in improving usability and latency of the web page that is experiencing slow connections.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIG. 2 depicts steps performed in a particular order for purposes of illustration and discussion, the methods of the present disclosure are not limited to the particularly illustrated order or arrangement. The various steps of the method 200 can be omitted, rearranged, combined, and/or adapted in various ways without deviating from the scope of the present disclosure.

The disclosure further provides, according to a first aspect, a computer-implemented method, comprising: providing a user interface associated with a first domain, the user interface comprising one or more interactive elements that enable a user to access one or more content items associated with a second domain; detecting a user selection of a first interactive element associated with a first content item of the one or more content items; determining the user has departed the user interface associated with the first domain to access the first content item in the second domain; determining that the user has returned to the user interface in the first domain without accessing the first content item; and in response to determining that the user has returned to the user interface without accessing the first content item, providing in the user interface a new interactive element that enables the user to access an alternative version of the first content item.

Optionally, the first domain is different from the second domain. Optionally, the alternative version of the first content item is located at a different web address than the first content item. Optionally, the user interface comprises a search results web page and the one or more interactive elements comprise one or more web page links that direct the user to access the one or more content items in the second domain, and wherein the first content item comprises a result web page that is listed as a search result in the search results web page. Optionally, the alternative version of the first content item has a smaller download size than the first content item. Optionally, the alternative version of the first content item comprises a transcoded version of the first content item. Optionally, the alternative version of the first content item comprises a cached version of the first content item. Optionally, the alternative version of the first content item comprises a content-reduced version of the first content item. Optionally, the content-reduced version of the first content item comprises a mobile-optimized version of the first content item. Optionally, the content-reduced version of the first content item has had one or more visual aspects of the first content item removed. Optionally, the content-reduced version of the first content item comprises one or more visual aspects of the first content item presented in a reduced resolution relative to the first content item. Optionally, the alternative version of the first content item is hosted at the first domain.

Optionally, determining that the user has returned to the user interface without accessing the first content item comprises: obtaining one or more signals from one or both of the first domain and a user device; and determining, based on the one or more signals, that the user failed to access the first content item.

Optionally, the one or more signals comprise a click duration signal received from the first domain that describes a time spent attempting to access the first content item at the second domain. Optionally, the one or more signals comprise a rate of return signal received from the first domain that describes how often users return to the user interface from the first content item. Optionally, the one or more signals comprise a connection success signal that describes whether the first content item loaded at least in part or did not load at all.

Optionally, the one or more signals comprise a time to first paint signal that describes how long it took for the user device to render any portion of the first content item. Optionally, the one or more signals comprise a time to first contentful paint signal that describes how long it took for the user device to render content of the first content item.

According to a second aspect, the disclosure further provides a computing system, comprising: one or more processors; and one or more non-transitory computer-readable media that collectively store instructions that, when executed by the one or more processors, cause the computing system to perform the computer-implemented method of the first aspect.

According to a third aspect, the disclosure further provides one or more non-transitory computer-readable media that collectively store instructions that, when executed by one or more processors, cause the one or more processors to perform the computer implemented-method of the first aspect.

What is claimed is:

1. A computing system, comprising:
one or more processors; and
one or more non-transitory computer-readable media that collectively store instructions that, when executed by the one or more processors, cause the computing system to perform operations, the operations comprising:
providing a user interface associated with a first domain, the user interface comprising one or more interactive elements that enable a user to access one or more content items associated with a second domain;
detecting a selection by the user of a first interactive element of the one or more interactive elements, the first interactive element associated with a first content item of the one or more content items;
determining the user has departed the user interface associated with the first domain to access the first content item associated with the second domain;
determining an occurrence of an on-back event indicating that the user has returned to the user interface associated with the first domain without accessing the first content item, wherein determining the user has returned to the user interface associated with the first domain without accessing the first content item comprises examining a screen buffer and determining that no new complete page has been loaded since the selection by the user of the first interactive element; and
in response to determining that the user has returned to the user interface without accessing the first content item, the on-back event triggering:
dynamically generating an alternative version of the first content item comprising a content-reduced version of the first content item, wherein the content-reduced version of the first content item has a smaller download size than the first content item; and
automatically updating the user interface to include a new interactive element that enables the user to access the alternative version of the first content item, wherein the new interactive element is configured to be positioned within the user interface in a position alongside the first interactive element within the user interface.

2. The computing system of claim 1, wherein the first domain is different from the second domain.

3. The computing system of claim 1, wherein the alternative version of the first content item is located at a different web address than the first content item.

4. The computing system of claim 1, wherein the user interface comprises a search results web page and the one or more interactive elements comprise one or more web page links that direct the user to access the one or more content items associated with the second domain, and wherein the first content item comprises a result web page that is listed as a search result in the search results web page.

5. The computing system of claim 1, wherein the alternative version of the first content item comprises a transcoded version of the first content item.

6. The computing system of claim 1, wherein the alternative version of the first content item comprises a cached version of the first content item.

7. The computing system of claim 1, wherein the content-reduced version of the first content item comprises a mobile-optimized version of the first content item.

8. The computing system of claim 1, wherein the content-reduced version of the first content item has had one or more visual aspects of the first content item removed.

9. The computing system of claim 1, wherein the content-reduced version of the first content item comprises one or more visual aspects of the first content item presented in a reduced resolution relative to the first content item.

10. The computing system of claim 1, wherein the alternative version of the first content item is hosted at the first domain.

11. The computing system of claim 1, wherein the determining that the user has returned to the user interface associated with the first domain without accessing the first content item further comprises:
obtaining one or more signals from one or both of the first domain and a user device; and
determining, based on the one or more signals, that the user failed to access the first content item.

12. The computing system of claim 11, wherein the one or more signals comprise a click duration signal received from the first domain that describes a time spent attempting to access the first content item associated with the second domain.

13. The computing system of claim 11, wherein the one or more signals comprise a rate of return signal received from the first domain that describes how often users return to the user interface from the first content item.

14. The computing system of claim 11, wherein the one or more signals comprise a connection success signal that describes whether the first content item loaded at least in part or did not load at all.

15. The computing system of claim 11, wherein the one or more signals comprise a time to first paint signal that describes how long it took for the user device to render any portion of the first content item.

16. The computing system of claim 11, wherein the one or more signals comprise a time to first contentful paint signal that describes how long it took for the user device to render content of the first content item.

17. The computing system of claim 1, the operations comprising:
automatically updating the user interface to include a message positioned with the new interactive element indicating that user selection of the new interactive element enables the user to access the alternative version of the first content item.

18. A computer-implemented method, comprising:
providing, by one or more computing devices, a user interface associated with a first domain, the user interface comprising one or more interactive elements that enable a user to access one or more content items associated with a second domain;
detecting, by the one or more computing devices, a selection by the user of a first interactive element of the one or more interactive elements, the first interactive element associated with a first content item of the one or more content items;
determining, by the one or more computing devices, the user has departed the user interface associated with the first domain to access the first content item associated with the second domain;
obtaining, by the one or more computing devices, one or more signals from one or both of the first domain and a user device operated by the user;

determining, by the one or more computing devices and based on the one or more signals, an occurrence of an on-back event indicating that the user has returned to the user interface associated with the first domain without accessing the first content item, wherein determining the user has returned to the user interface associated with the first domain without accessing the first content item comprises examining a screen buffer and determining that no new complete page has been loaded since the selection by the user of the first interactive element; and in response to determining that the user has returned to the user interface associated with the first domain without accessing the first content item, the on-back event triggering:

dynamically generating, by the one or more computing devices, an alternative version of the first content item comprising a content-reduced version of the first content item, wherein the content-reduced version of the first content item has a smaller download size than the first content item; and providing, by the one or more computing devices, in the user interface a new interactive element that enables the user to access the alternative version of the first content item;

automatically updating, by the one or more computing devices, the user interface to include the new interactive element that enables the user to access the alternative version of the first content item, wherein the new interactive element is configured to be positioned within the user interface in a position alongside the first interactive element within the user interface.

19. One or more non-transitory computer-readable media that collectively store instructions that, when executed by one or more processors, cause the one or more processors to perform operations, the operations comprising:

providing a user interface associated with an internal server, the user interface comprising one or more interactive elements that enable a user to access one or more content items respectively associated with one or more external servers that are separate from the internal server;

detecting a selection by the user of a first interactive element of the one or more interactive elements, the first interactive element associated with a first content item of the one or more content items, the first content item associated with a first external server of the one or more external servers;

determining the user has departed the user interface associated with the internal server to access the first content item associated with the first external server;

determining an occurrence of an on-back event indicating that the user has returned to the user interface associated with the internal server without accessing the first content item, wherein determining the user has returned to the user interface associated with the internal server without accessing the first content item comprises examining a screen buffer and determining that no new complete page has been loaded since the selection by the user of the first interactive element;

in response to determining that the user has returned to the user interface without accessing the first content item, the on-back event triggering:

dynamically generating an alternative version of the first content item comprising a content-reduced version of the first content item, wherein the content-reduced version of the first content item has a smaller download size than the first content item; and automatically updating the user interface to include a new interactive element that enables the user to access the alternative version of the first content item, wherein the alternative version of the first content item is hosted by the internal server, and wherein the new interactive element is configured to be positioned within the user interface in one of a position alongside the first interactive element within the user interface.

* * * * *